(12) United States Patent
Murakami

(10) Patent No.: US 11,292,461 B2
(45) Date of Patent: Apr. 5, 2022

(54) VEHICLE DRIVING ASSIST APPARATUS

(71) Applicant: Toyota Jidosha Kabushiki Kaisha, Toyota (JP)

(72) Inventor: Ryota Murakami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 169 days.

(21) Appl. No.: 15/930,960

(22) Filed: May 13, 2020

(65) Prior Publication Data
US 2020/0361455 A1 Nov. 19, 2020

(30) Foreign Application Priority Data

May 14, 2019 (JP) .............................. JP2019-091368

(51) Int. Cl.
| | |
|---|---|
| *B60W 30/09* | (2012.01) |
| *B60W 30/095* | (2012.01) |
| *G08G 1/01* | (2006.01) |
| *G08G 1/16* | (2006.01) |
| *B62D 15/02* | (2006.01) |
| *G06K 9/00* | (2006.01) |

(52) U.S. Cl.
CPC ........ *B60W 30/0956* (2013.01); *B60W 30/09* (2013.01); *B62D 15/021* (2013.01); *G06K 9/00798* (2013.01); *G08G 1/0145* (2013.01); *G08G 1/166* (2013.01); *G08G 1/167* (2013.01); *B60W 2510/081* (2013.01)

(58) Field of Classification Search
CPC ............. B60W 30/0956; B60W 30/09; B60W 2510/081; B62D 15/021; G06K 9/00798; G08G 1/0145; G08G 1/166; G08G 1/167
See application file for complete search history.

(56) References Cited

U.S. PATENT DOCUMENTS

| | | | | |
|---|---|---|---|---|
| 10,477,163 | B2* | 11/2019 | Park ...................... | B60W 40/04 |
| 2018/0354529 | A1* | 12/2018 | Ota ........................ | G07C 5/085 |
| 2019/0100197 | A1* | 4/2019 | Saiki ..................... | B60W 30/09 |
| 2020/0262420 | A1* | 8/2020 | Ikeda ................ | B60W 50/0225 |
| 2020/0391733 | A1* | 12/2020 | Kumagai .............. | B60W 30/09 |

FOREIGN PATENT DOCUMENTS

JP 2002-260193 A 9/2002

* cited by examiner

*Primary Examiner* — Peter D Nolan
*Assistant Examiner* — Demetra R Smith-Stewart
(74) *Attorney, Agent, or Firm* — Dinsmore & Shohl LLP

(57) ABSTRACT

A vehicle driving assist apparatus acquires a longitudinal distance between an own vehicle and an oncoming vehicle, and a lateral distance between the own vehicle and the oncoming vehicle. The vehicle driving assist apparatus acquires a collision index value which decreases as a ratio of the longitudinal distance to the lateral distance decreases and determine that the own vehicle potentially collides with the oncoming vehicle when a turning condition is satisfied, and a collision condition is satisfied. The turning condition is a condition that the own vehicle turns, crossing an oncoming traffic lane. The collision condition is a condition that the collision index value is within a predetermined index value range. The predetermined index value range at least includes the collision index value acquired when the longitudinal distance is equal to the lateral distance.

9 Claims, 8 Drawing Sheets

VEHICLE DRIVING ASSIST APPARATUS

CROSS-REFERENCE TO RELATED APPLICATIONS

This application claims priority to Japanese patent application No. JP 2019-091368 filed on May 14, 2019, the content of which is hereby incorporated by reference in its entirety.

BACKGROUND

Field

The disclosure relates to a vehicle driving assist apparatus.

Description of the Related Art

There is known a vehicle driving assist apparatus which determines whether an own vehicle turning rightward in an intersection potentially collides with an oncoming vehicle moving straight in the intersection. This vehicle driving assist apparatus alerts a driver of the own vehicle that a potential that the own vehicle collides with the oncoming vehicle is high when the vehicle driving assist apparatus determines that the potential that the own vehicle collides with the oncoming vehicle is high. Thereby, the vehicle driving assist apparatus prevents the own vehicle from colliding with the oncoming vehicle. Hereinafter, the own vehicle turning rightward in the intersection will be referred to as "the rightward-turning own vehicle."

There is also known a vehicle driving assist apparatus which determines whether the potential that the rightward-turning own vehicle collides with the oncoming vehicle is high, based on a required time difference (see JP 2002-260193 A). The required time difference is a difference between (i) a time required for the rightward-turning own vehicle to reach a rightward-turning starting point and (ii) a time required for the oncoming vehicle to reach the intersection. The rightward-turning starting point is a point where the rightward-turning own vehicle starts to turn rightward in the intersection. Hereinafter, the time required for the rightward-turning own vehicle to reach the rightward-turning starting point, will be referred to as "a first required time", and the time required for the oncoming vehicle to reach the intersection, will be referred to as "the second required time."

The known vehicle driving assist apparatus calculates the first required time, using (i) a distance from a current position of the rightward-turning own vehicle to the rightward-turning starting point and (ii) a moving speed of the rightward-turning own vehicle. In addition, the known vehicle driving assist apparatus calculates the second required time, using (i) a distance from a current position of the oncoming vehicle to the intersection and (ii) a moving speed of the oncoming vehicle. Accordingly, when the required time difference is small, a timing of the rightward-turning own vehicle reaching the rightward-turning starting point is near a timing of the oncoming vehicle reaching the intersection. Thus, the potential that the rightward-turning own vehicle collides with the oncoming vehicle is high.

The rightward-turning own vehicle may take time to complete crossing a moving course of the oncoming vehicle in the intersection after the rightward-turning own vehicle reaches the rightward-turning starting point and starts to turn rightward. Therefore, even when the timing of the rightward-turning own vehicle reaching the rightward-turning starting point is near the timing of the oncoming vehicle reaching the intersection, the oncoming vehicle may complete crossing a moving course of the rightward-turning own vehicle before the rightward-turning vehicle reaches the moving course of the oncoming vehicle. If the vehicle driving assist apparatus alerts the driver of the rightward-turning own vehicle that the potential that the rightward-turning own vehicle collides with the oncoming vehicle is high, the alert may be useless. In other words, the vehicle driving assist apparatus may not make an accurate determination of the potential that the rightward-turning own vehicle collides with the oncoming vehicle.

SUMMARY

The present disclosure has been made for solving problems described above. An object of the present disclosure is to provide a vehicle driving assist apparatus which can determine accurately the potential that the rightward-turning own vehicle collides with the oncoming vehicle.

A vehicle driving assist apparatus according to the present disclosure comprises an information acquisition apparatus and an electronic control unit. The information acquisition apparatus acquires information on situations ahead of the own vehicle as forward situation information. The electronic control unit determines whether an own vehicle potentially collides with an oncoming vehicle, based on the forward situation information.

The electronic control unit is configured to acquire, as a longitudinal distance, a distance between a first lateral line and a second lateral line, based on the forward situation information. The first lateral line horizontally extends perpendicular to a moving direction of the oncoming vehicle and passes through a specified reference point of the own vehicle. The second lateral line extends parallel to the first lateral line and passes through a specified reference point of the oncoming vehicle.

The electronic control unit is further configured to acquire, as a lateral distance, a distance between a first longitudinal line and a second longitudinal line, based on the forward situation information. The first longitudinal line horizontally extends perpendicular to the first lateral line and passes through the specified reference point of the own vehicle. The second longitudinal line extends parallel to the first longitudinal line and passes through the specified reference point of the oncoming vehicle.

The electronic control unit is further configured to acquire, as a collision index value, a value which decreases as a ratio of the longitudinal distance to the lateral distance decreases.

The electronic control unit is further configured to determine that the own vehicle potentially collides with the oncoming vehicle when (i) a turning condition is satisfied, and (ii) a collision condition is satisfied. The turning condition is a condition that the own vehicle turns, crossing an oncoming traffic lane. The collision condition is a condition that the collision index value is within a predetermined index value range. The predetermined index value range at least includes the collision index value acquired when the longitudinal distance is equal to the lateral distance.

When (i) the own vehicle turns, crossing the oncoming traffic lane, and (ii) the oncoming vehicle exists, the longitudinal distance gradually shortens. A potential that the own vehicle collides with the oncoming vehicle, increases as the longitudinal distance shortens. Thus, there may be a way to (i) acquire an index value which decreases as the longitudinal distance shortens, independently of the lateral distance and is zero when the longitudinal distance is zero and (ii) determine that the own vehicle potentially collides with the oncoming vehicle when the acquired index value decreases to or below a predetermined threshold. Hereinafter, the potential that the own vehicle collides with the oncoming vehicle, will be referred to as "the collision potential."

In this regard, there is a distance between a moving course of the oncoming vehicle and a position of the own vehicle (i.e., the lateral distance). Thus, even when the longitudinal distance shortens with the large lateral distance, the collision potential is small. Therefore, when the collision potential is determined, only based on the longitudinal distance without the lateral distance, an accuracy of a determination of the collision potential is lower than when the collision potential is determined, based on both the longitudinal distance and the lateral distance.

The vehicle driving assist apparatus according to the present disclosure determines the collision potential, using the collision index value which decreases as the ratio of the longitudinal distance to the lateral distance decreases. That is, the vehicle driving assist apparatus determines the collision potential in consideration of both the longitudinal distance and the lateral distance. Thereby, the vehicle driving assist apparatus can determine the collision potential with a large accuracy.

According to an aspect of the present disclosure, the electronic control unit may be further configured to acquire, as a longitudinal relative moving speed, a relative moving speed between the own vehicle and the oncoming vehicle in an extension direction of the first longitudinal line. In this case, the electronic control unit may be further configured to acquire, as a lateral relative moving speed, a relative moving speed between the own vehicle and the oncoming vehicle in an extension direction of the first lateral line. In addition, the electronic control unit may be further configured to acquire, as the collision index value, a value which (i) decreases as the ratio of the longitudinal distance to the lateral distance decreases, (ii) decreases as the longitudinal relative moving speed increases, and (iii) increases as the lateral relative moving speed increases.

Under a state that the longitudinal distance is the same, the oncoming vehicle takes a shorter time to reach a moving course of the own vehicle when the longitudinal relative moving speed is large than when the longitudinal relative moving speed is small. Similarly, under a state that the lateral distance is the same, the own vehicle takes a shorter time to reach the moving course of the oncoming vehicle when the lateral relative moving speed is large than when the lateral relative moving speed is small. Therefore, a timing of the oncoming vehicle reaching the moving course of the own vehicle varies, depending on the longitudinal relative moving speed. In addition, a timing of the own vehicle reaching the moving course of the oncoming vehicle varies, depending on the lateral relative moving speed. When the timing of the oncoming vehicle reaching the moving course of the own vehicle and the timing of the own vehicle reaching the moving course of the oncoming vehicle are the same, the own vehicle collides with the oncoming vehicle. Therefore, the accuracy of the determination of the collision potential in consideration of the longitudinal distance and the lateral distance without the longitudinal relative moving speed and the lateral relative moving speed, is lower than the accuracy of the determination of the collision potential in consideration of the longitudinal distance, the lateral distance, the longitudinal relative moving speed and the lateral relative moving speed.

The vehicle driving assist apparatus according to this aspect of the present disclosure determines the collision potential, using the collision index value which (i) decreases as the ratio of the longitudinal distance to the lateral distance decreases, (ii) decreases as the longitudinal relative moving speed increases, and (iii) increases the lateral relative moving speed increase. That is, the vehicle driving assist apparatus determines the collision potential in consideration of the longitudinal distance, the lateral distance, the longitudinal relative moving speed, and the lateral relative moving speed. Therefore, the vehicle driving assist apparatus can determine the collision potential with more accuracy.

According to another aspect of the present disclosure, the electronic control unit may be further configured to determine that the turning condition is satisfied when (i) a steering angle of the own vehicle is larger than or equal to a predetermined steering angle, and (ii) a moving speed of the own vehicle is within a predetermined speed range. In this case, the predetermined steering angle may correspond to the steering angle of the own vehicle minimally necessary to turn the own vehicle, crossing the oncoming traffic lane. In addition, the predetermined speed range may correspond to a range of the moving speed of the own vehicle turning, crossing the oncoming traffic lane.

The own vehicle potentially collides with the oncoming vehicle when the own vehicle turns, crossing the oncoming traffic lane. In other words, the own vehicle won't collide with the oncoming vehicle when the own vehicle moves straight or turns away from the oncoming traffic lane. Therefore, it may be determined whether the own vehicle potentially collides with the oncoming vehicle when the own vehicle turns, crossing the oncoming traffic lane. Thus, it may be determined whether the own vehicle turns, crossing the oncoming traffic lane with large accuracy.

When the driver of the own vehicle turns the own vehicle, crossing the oncoming traffic lane, the driver of the own vehicle relatively largely operates a steering wheel of the own vehicle, maintaining the moving speed of the own vehicle at a relatively low speed. Therefore, when the own vehicle turns, crossing the oncoming traffic lane, the moving speed of the own vehicle is relatively low, and the steering angle of the own vehicle is relatively large. Thus, when (i) the moving speed of the own vehicle is within a specified speed range, and (ii) the steering angle of the own vehicle is relatively large, the own vehicle turns, crossing the oncoming traffic lane.

The vehicle driving assist apparatus according to this aspect of the present disclosure determines that the turning condition that the own vehicle turns, crossing the oncoming traffic vehicle, is satisfied when (i) the steering angle of the own vehicle is larger than or equal to the predetermined steering angle, and (ii) the moving speed of the own vehicle is within the predetermined speed range and then determines whether the own vehicle potentially collides with the oncoming vehicle. Thus, the vehicle driving assist apparatus can determine the collision potential with more accuracy.

According to further another aspect of the present disclosure, the electronic control unit may be further configured to determine that the turning condition is satisfied when (i) a steering angle of the own vehicle is larger than or equal to a predetermined steering angle, (ii) a moving speed of the own vehicle is within a predetermined moving speed range, and (iii) a turn signal of the own vehicle indicates that the own vehicle will turn toward the oncoming traffic lane. In this case, the predetermined steering angle may correspond to the steering angle of the own vehicle necessary to turn the own vehicle, crossing the oncoming traffic lane. In addition, the predetermined moving speed range may correspond to a range of the moving speed of the own vehicle turning, crossing the oncoming traffic lane.

In general, when the driver of the own vehicle turns, crossing the oncoming traffic lane, the driver sets the turn signal of the own vehicle at an operation state indicating that the own vehicle will turn toward the oncoming traffic lane. Therefore, when (i) the moving speed of the own vehicle is within a specified speed range, (ii) the steering angle of the own vehicle is relatively large, and (iii) the turn signal is in the operation state indicating that the own vehicle will turn toward the oncoming traffic lane, the own vehicle turns, crossing the oncoming traffic lane.

The vehicle driving assist apparatus according to this aspect of the present disclosure determines that the turn condition that the own vehicle turns, crossing the oncoming traffic lane is satisfied when (i) the steering angle of the own vehicle is larger than or equal to the predetermined steering angle, (ii) the moving speed of the own vehicle is within the predetermined speed range, and (iii) the turn signal of the own vehicle indicates that the own vehicle will turn toward the oncoming traffic lane and then determines whether the own vehicle potentially collides with the oncoming vehicle. Thus, the vehicle driving assist apparatus can determine the collision potential with more accuracy.

According to further another aspect of the present disclosure, the electronic control unit may be further configured to determine that the turning condition is satisfied when (i) a moving speed of the own vehicle is within a predetermined moving speed range, and (ii) a turn signal of the own vehicle indicates that the own vehicle will turn toward the oncoming traffic lane. In this case, the predetermined moving speed range may correspond to a range of the moving speed of the own vehicle turning, crossing the oncoming traffic lane.

In general, when the driver of the own vehicle turns the own vehicle, crossing the oncoming traffic lane, the driver sets the turn signal of the own vehicle at an operation state indicating that the own vehicle will turn toward the oncoming traffic lane and causes the own vehicle to move, maintaining the moving speed of the own vehicle at a relatively low speed. Thus, when (i) the moving speed of the own vehicle is within a specified speed range, and (ii) the turn signal is in the operation state indicating that the own vehicle will turn toward the oncoming traffic lane, the own vehicle turns, crossing the oncoming traffic lane.

The vehicle driving assist apparatus according to this aspect of the present disclosure determines that the turning condition that the own vehicle turns, crossing the oncoming traffic lane, is satisfied when (i) the moving speed of the own vehicle is within the predetermined speed range, and (ii) the turn signal of the own vehicle is in the operation state indicating that the own vehicle will turn toward the oncoming traffic lane. Thus, the vehicle driving assist apparatus can determine the collision potential with more accuracy.

According to further another aspect of the present disclosure, the electronic control unit may be further configured to brake and stop the own vehicle when the electronic control unit determines that the own vehicle potentially collides with the oncoming vehicle.

The vehicle driving assist apparatus according to this aspect of the present disclosure stops the own vehicle when the own vehicle potentially collides with the oncoming vehicle. Thus, the vehicle driving assist apparatus can prevent the own vehicle from colliding with the oncoming vehicle.

According to further another aspect of the present disclosure, the electronic control unit may be further configured to provide a driver of the own vehicle with an alert for informing that the own vehicle potentially collides with the oncoming vehicle when the electronic control unit determines that the own vehicle potentially collides with the oncoming vehicle.

The vehicle driving assist apparatus according to this aspect of the present disclosure provides the driver of the own vehicle with the alert informing that the own vehicle potentially collides with the oncoming vehicle when the own vehicle potentially collides with the oncoming vehicle. The vehicle driving assist apparatus promotes the driver of the own vehicle to brake the own vehicle. Thus, the vehicle driving assist apparatus can prevent the own vehicle from colliding with the oncoming vehicle with certainty.

According to further another aspect of the present disclosure, the electronic control unit may be further configured to control a driving torque applied to the own vehicle to zero when the electronic control unit determines that the own vehicle potentially collides with the oncoming vehicle.

The vehicle driving assist apparatus according to this aspect of the present disclosure prevents the driving torque from being applied to the own vehicle when the own vehicle potentially collides with the oncoming vehicle. Thereby, the vehicle driving assist apparatus decelerates the own vehicle. Thus, the vehicle driving assist apparatus can prevent the own vehicle from colliding with the oncoming vehicle with more certainty.

The information acquisition apparatus may include at least one of a radar sensor and a camera apparatus.

Elements of the present disclosure are not limited to elements of embodiments and modified examples of the present disclosure described along with the drawings. The other objects, features and accompanied advantages of the present disclosure can be easily understood from the embodiments and the modified examples of the present disclosure.

DESCRIPTION OF THE EMBODIMENTS

Below a vehicle driving assist apparatus according to an embodiment of the present disclosure will be described with reference to the drawings. Hereinafter, the vehicle driving assist apparatus according to the embodiment of the present disclosure will be referred to as "the embodiment driving assist apparatus." The embodiment driving assist apparatus is applied to a vehicle 100 shown in FIG. 1. Hereinafter, the vehicle 100 will be referred to as "the own vehicle 100."

The embodiment driving assist apparatus includes an ECU 90. ECU stands for electronic control unit. The ECU 90 includes a microcomputer as a main component. The microcomputer includes a CPU, a ROM, a RAM, a non-volatile memory, and an interface. The CPU is configured to realize various functions by executing instructions, programs, and routines stored in the ROM.

<Driving Torque Generation Apparatus>

Figure 1:
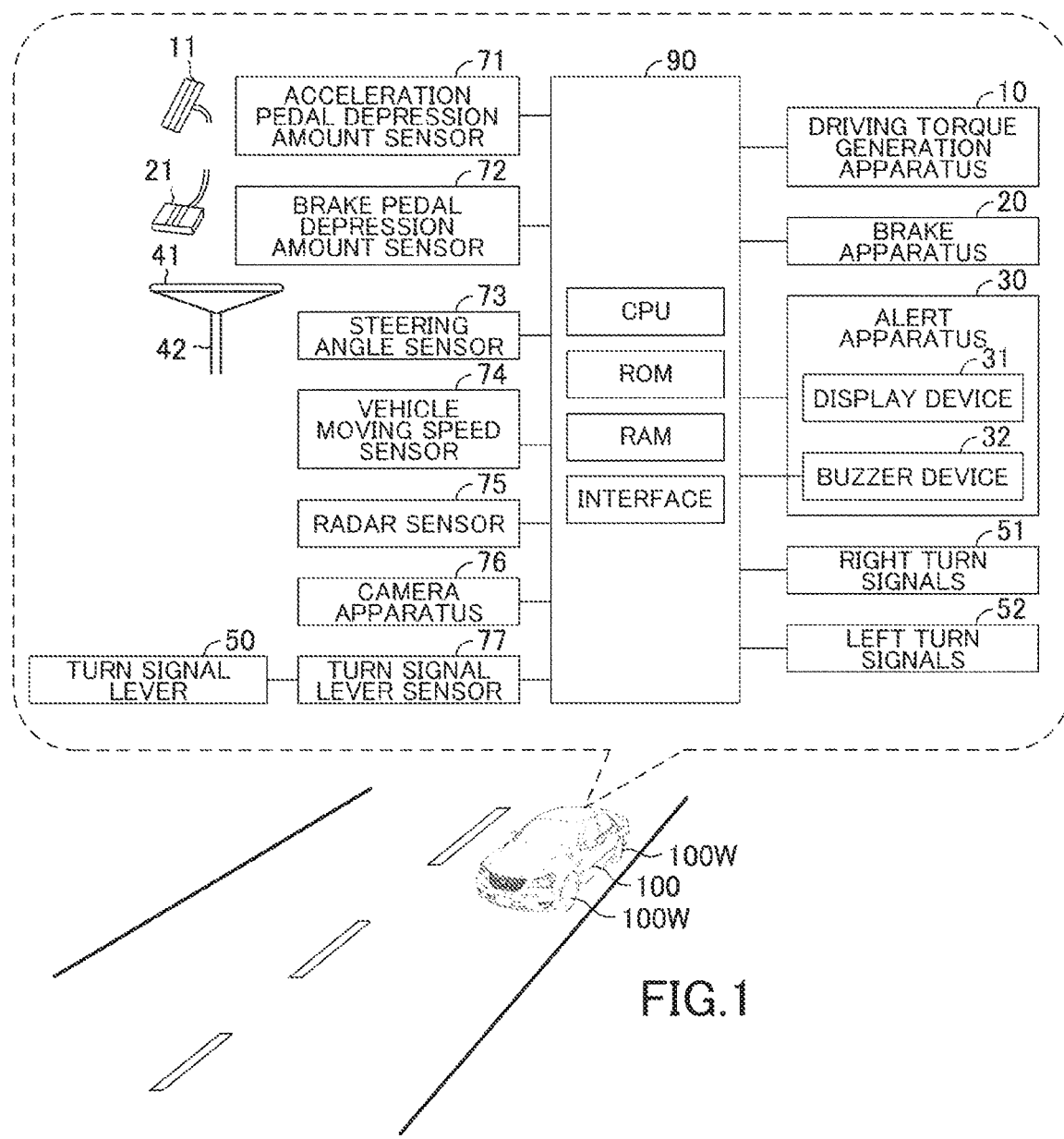
FIG. 1 is a view which shows a vehicle driving assist apparatus according to an embodiment of the present disclosure and an own vehicle to which the vehicle driving assist apparatus is applied.

As shown in FIG. 1, the own vehicle 100 is installed with a driving torque generation apparatus 10. The driving torque generation apparatus 10 includes an internal combustion engine (not shown), a motor generator (not shown), a battery (not shown), and an inverter (not shown). The internal combustion engine includes fuel injectors and other components.

The driving torque generation apparatus 10 is electrically connected to the ECU 90. In particular, the fuel injectors of the driving torque generation apparatus 10 and the inverter are electrically connected to the ECU 90. The ECU 90 can control a torque output from the internal combustion engine by controlling operations of the fuel injectors. The ECU 90 can control a torque output from the motor generator by controlling operations of the inverter to control an amount of power supplied to the motor generator from the battery. That is, the ECU 90 can control the torque output from the driving torque generation apparatus 10 by controlling operations of the driving torque generation apparatus 10. Hereinafter, the torque output from the driving torque generation apparatus 10 will be referred to as "the driving torque TQdrv."

The driving torque TQdrv is transmitted to right and left front wheels 100W via a drive shaft (not shown). The own vehicle 100 is driven by the driving torque TQdry transmitted to the right and left front wheels 100W.

The own vehicle 100 to which the embodiment driving assist apparatus is applied, is a so-called hybrid vehicle. In this regard, the own vehicle 100 may be a vehicle installed with the internal combustion engine only as the driving torque generation apparatus 10. Further, the own vehicle 100 may be a so-called plug-in hybrid vehicle installed with the internal combustion engine and the motor generator as the driving torque generation apparatus 10 and the battery chargeable with an outside power source. Furthermore, the own vehicle 100 may be a so-called electric vehicle installed with the motor generator only as the driving torque generation apparatus 10. Further, the own vehicle 100 may be a so-called fuel-cell vehicle installed with the motor generator as the driving torque generation apparatus 10 and which motor generator being operated by electric power generated by fuel cells.

<Brake Apparatus>

The own vehicle 100 is installed with a brake apparatus 20. The brake apparatus 20 can apply braking forces to left and right rear wheels 100W of the own vehicle 100 in addition to the left and right front wheels 100W. The brake apparatus 20 is electrically connected to the ECU 90. The ECU 90 can control the braking forces BK applied to the wheels 100W by controlling operations of the brake apparatus 20.

The own vehicle 100 is installed with an alert apparatus 30. The alert apparatus 30 includes a display device 31 and a buzzer device 32. The alert apparatus 30 is electrically connected to the ECU 90. The ECU 90 can control images displayed on the display device 31 and cause the buzzer device 32 to sound by controlling operations of the alert apparatus 30.

<Other Components>

As shown in FIG. 1, the own vehicle 100 is installed with an acceleration pedal 11, a brake pedal 21, a turn signal lever 50, right turn signals 51, left turn signals 52, an acceleration pedal depression amount sensor 71, a brake pedal depression amount sensor 72, a steering angle sensor 73, a vehicle moving speed sensor 74, a radar sensor 75, a camera apparatus 76, and a turn signal lever sensor 77.

The acceleration pedal depression amount sensor 71 is electrically connected to the ECU 90. The acceleration pedal depression amount sensor 71 detects an amount of depression applied to the acceleration pedal 11 by a driver of the own vehicle 100 and sends a signal representing the detected amount to the ECU 90. The ECU 90 acquires the amount of the depression applied to the acceleration pedal 11 by the driver of the own vehicle 100, based on the signal sent from the acceleration pedal depression amount sensor 71. Hereinafter, the amount of the depression applied to the acceleration pedal 11 by the driver of the own vehicle 100 will be referred to as "the acceleration pedal depression amount AP."

The brake pedal depression amount sensor 72 is electrically connected to the ECU 90. The brake pedal depression amount sensor 72 detects an amount of depression applied to the brake pedal 21 by the driver of the own vehicle 100 and sends a signal representing the detected amount to the ECU 90. The ECU 90 acquires the amount of depression applied to the brake pedal 21 by the driver of the own vehicle 100, based on the signal sent from the brake pedal depression amount sensor 72. Hereinafter, the amount of depression applied to the brake pedal 21 by the driver of the own vehicle 100 will be referred to as "the brake pedal depression amount BP."

The steering angle sensor 73 is electrically connected to the ECU 90. The steering angle sensor 73 detects an angle of rotation of a steering shaft 42 by the driver of the own vehicle 100 rotating a steering wheel 41 and sends a signal representing the detected angle to the ECU 90. The ECU 90 acquires a rightward-turning steering angle SAR and a leftward-turning steering angle SAL, based on the signal sent from the steering angle sensor 73. In addition, the ECU 90 acquires an angle requested as a front wheel steering angle SAF, based on the acquired rightward-turning steering angle SAR and a leftward-turning steering angle SAL.

The rightward-turning steering angle SAR is an angle of clockwise rotation of the steering shaft 42 from a reference rotational position of the steering shaft 42. The reference rotational position corresponds to a rotational position of the steering shaft 42 which causes the own vehicle 100 to move straight. When the steering shaft 42 is positioned at the reference rotational position, the steering angle SA of the steering shaft 42 is zero degrees. The leftward-turning steering angle SAL is an angle of counterclockwise rotation of the steering shaft 42 from the reference rotational position of the steering shaft 42.

The vehicle moving speed sensor 74 includes four wheel rotation speed sensors. The wheel rotation speed sensors are electrically connected to the ECU 90. The wheel rotation speed sensors detect rotation speeds of the wheels 100W, respectively and send signals representing the detected rotation speeds, respectively to the ECU 90. The ECU 90 acquires the rotation speeds of the wheels 100W as wheel rotation speeds Vrot1 to Vrot4, respectively, based on the signals sent from the wheel rotation speed sensors. In addition, the ECU 90 acquires a moving speed of the own vehicle 100, based on an average of the acquired wheel rotation speeds Vrot1 to Vrot4 and lengths of circumferences of the wheels 100W. Hereinafter, the moving speed of the own vehicle 100 will be referred to as "the own vehicle moving speed V1."

The radar sensor 75 is mounted on the own vehicle 100 to output millimeter waves forward of the own vehicle 100. The radar sensor 75 is electrically connected to the ECU 90. The radar sensor 75 outputs the millimeter waves forward of the own vehicle 100. When there is an object ahead of the own vehicle 100, the millimeter wave output from the radar sensor 75 is reflected by the object. The radar sensor 75 receives the millimeter waver reflected by the object. The radar sensor 75 sends data on the millimeter waves output from the radar sensor 75 and the millimeter waves received by the radar sensor 75 to the ECU 90. Hereinafter, the data on the millimeter waves output from the radar sensor 75 and the millimeter waves received by the radar sensor 75, will be referred to as "the millimeter wave data." The radar sensor 75 is one of information acquisition apparatuses which acquire information on situations ahead of the own vehicle 100 as forward situation information. The millimeter wave data is the forward situation information. The radar sensor 75 may be a sensor which outputs laser or ultrasonic waves.

The camera apparatus 76 includes a monocular camera or a stereo camera. The camera apparatus 76 is mounted on the own vehicle 100 to take images of a view ahead of the own vehicle 100. The camera apparatus 76 is electrically connected to the ECU 90. The camera apparatus 76 sends data on the taken images to the ECU 90. Hereinafter, the data on the taken images will be referred to as "the image data." The camera apparatus 76 is one of the information acquisition apparatuses which acquire the information on the situations ahead of the own vehicle 100 as the forward situation information. The image date is the forward situation information.

The turn signal lever sensor 77 is electrically connected to the ECU 90. When the driver of the own vehicle 100 operates the turn signal lever 50 for blinking the right turn signals 51, the turn signal lever sensor 77 sends a signal representing that the turn signal lever 50 is operated for blinking the right turn signals 51 to the ECU 90. Hereinafter, the signal representing that the turn signal lever 50 is operated for blinking the right turn signals 51, will be referred to as "the rightward-turning signal." The right turn signals 51 are mounted on right front and rear corners of the own vehicle 100, respectively. The driver of the own vehicle 100 operates the turn signal lever 50 to blink the right turn signals 51 when the driver intends to inform persons outside of the own vehicle 100 that the driver will turn the own vehicle 100 rightward. The ECU 90 blinks the right turn signals 51 when the ECU 90 receives the rightward-turning signal.

Figure 3A:
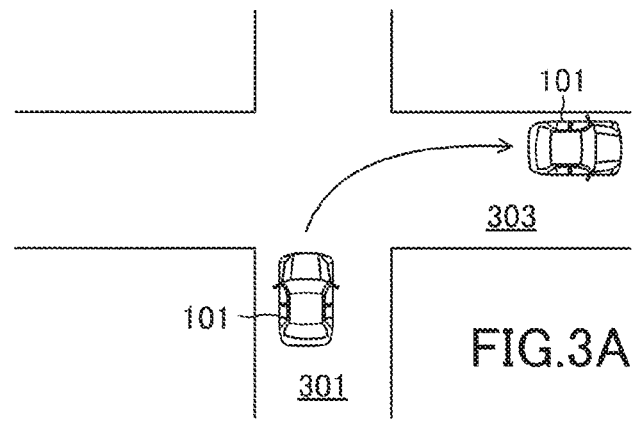
FIG. 3A is a view used for describing a rightward turning of the own vehicle onto a perpendicular crossing road.
Figure 3B:
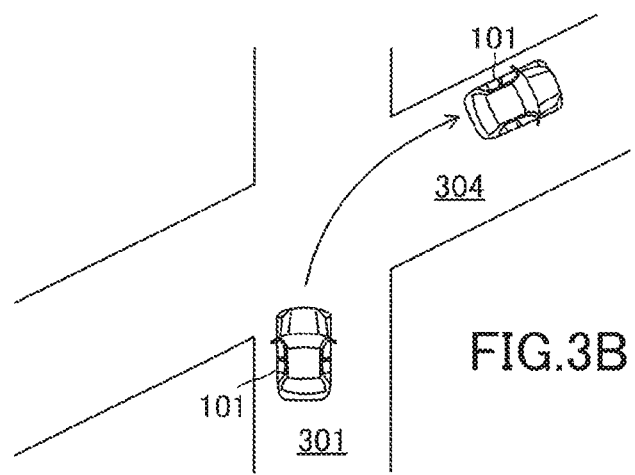
FIG. 3B is a view used for describing a rightward turning of the own vehicle onto an obliquely crossing road.
Figure 3C:
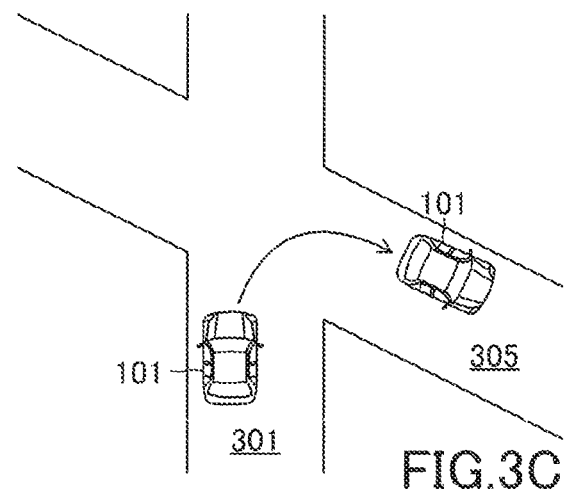
FIG. 3C is a view used for describing a rightward turning of the own vehicle onto an obliquely crossing road.

As shown in FIG. 3A, in this embodiment, the rightward-turning includes a turning of a vehicle 101 turns rightward from a road 301 to a road 303. The vehicle 101 moves on the road 301 before the vehicle 101 turns rightward. The road 303 is provided perpendicular to the road 301. In addition, as shown in FIGS. 3B and 3C, the rightward-turning includes a turning of the vehicle 101 from the road 301 to a road 304 and a turning of the vehicle 101 from the road 301 to a road 305. The vehicle 101 moves on the road 301 before the vehicle 101 turns right. The road 304 is provided obliquely crossing the road 301. The road 305 is provided obliquely crossing the road 301.

On the other hand, when the driver of the own vehicle 100 operates the turn signal lever 50 for blinking the left turn signals 52, the turn signal lever sensor 77 sends a signal representing that the turn signal lever 50 is operated for blinking the left turn signals 52 to the ECU 90. Hereinafter, the signal representing that the turn signal lever 50 is operated for blinking the left turn signals 52, will be referred to as "the leftward-turning signal." The left turn signals 52 are mounted on left front and rear corners of the own vehicle 100, respectively. The driver of the own vehicle 100 operates the turn signal lever 50 to blink the left turn signals 52 when the driver intends to inform the persons outside of the own vehicle 100 that the driver will turn the own vehicle 100 leftward. The ECU 90 blinks the left turn signals 52 when the ECU 90 receives the leftward-turning signal.

Figure 4A:
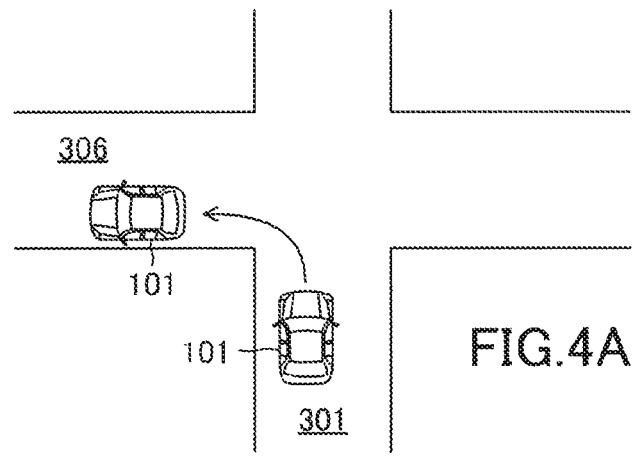
FIG. 4A is a view used for describing a leftward turning of the own vehicle onto a perpendicular crossing road.
Figure 4B:
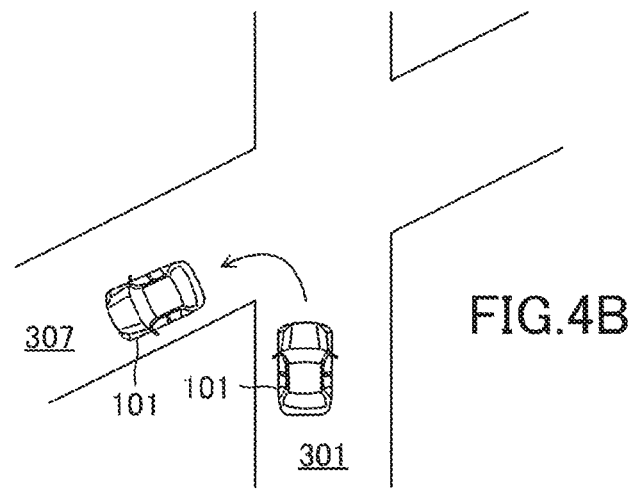
FIG. 4B is a view used for describing a leftward turning of the own vehicle onto an obliquely crossing road.
Figure 4C:
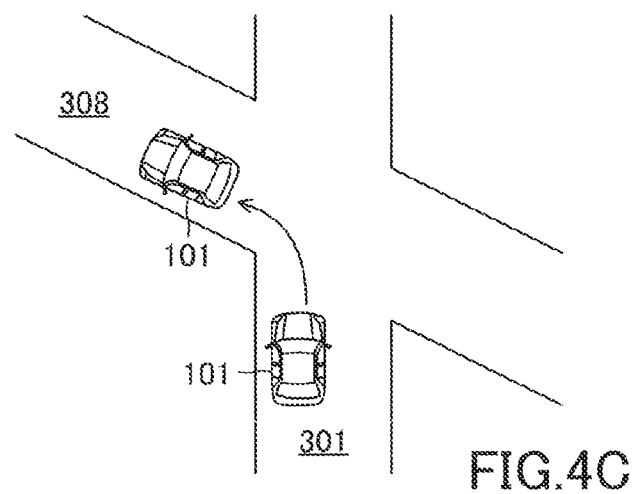
FIG. 4C is a view used for describing a leftward turning of the own vehicle onto an obliquely crossing road.

As shown in FIG. 4A, in this embodiment, the leftward-turning includes a turning of the vehicle 101 turns leftward from the road 301 to a road 306. The vehicle 101 moves on the road 301 before the vehicle 101 turns rightward. The road 306 is provided perpendicular to the road 301. In addition, as shown in FIGS. 4B and 4C, the leftward-turning includes a turning of the vehicle 101 from the road 301 to a road 307 and a turning of the vehicle 101 from the road 301 to a road 308. The vehicle 101 moves on the road 301 before the vehicle 101 turns leftward. The road 307 is provided obliquely crossing the road 301. The road 308 is provided obliquely crossing the road 301.

Summary of Operations of Embodiment Driving Assist Apparatus

Next, a summary of operations of the embodiment driving assist apparatus will be described. The embodiment driving assist apparatus is configured to selectively execute a normal acceleration/deceleration control and a rightward-turning collision avoidance control.

The normal acceleration/deceleration control is a control to control an acceleration and a deceleration of the own vehicle 100, depending on operations applied to the acceleration pedal 11 and the brake pedal 21 by the driver.

Figure 2:
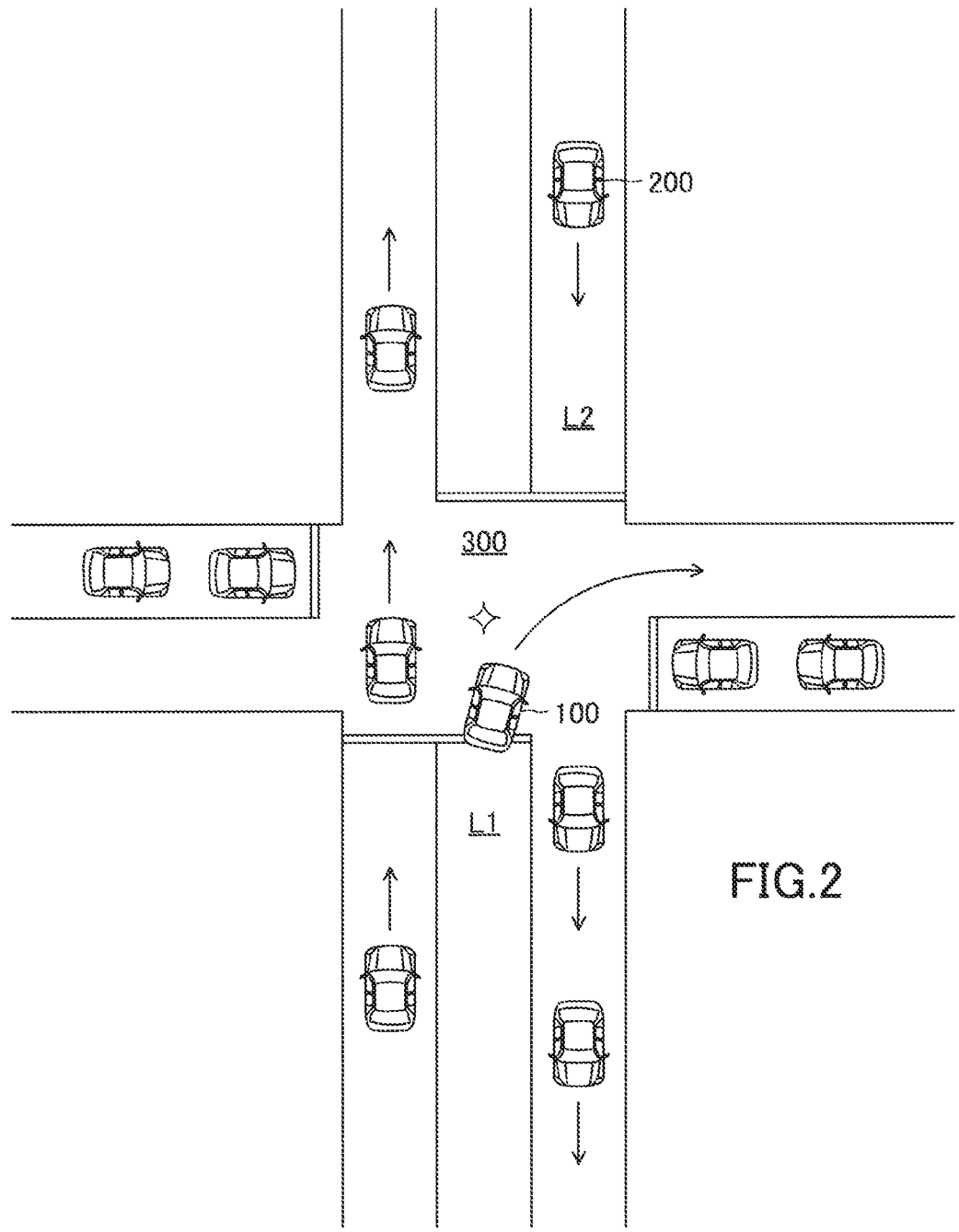
FIG. 2 is a view used for describing a rightward-turning collision avoidance control executed by the vehicle driving assist apparatus.

The rightward-turning collision avoidance control is a control to stop the own vehicle 100 to avoid the own vehicle 100 from colliding with an oncoming vehicle 200 when the own vehicle 100 potentially collides with the oncoming vehicle 200 as the own vehicle 100 turns rightward. For example, as shown in FIG. 2, the rightward-turning collision avoidance control is a control to stop the own vehicle 100 to avoid the own vehicle 100 from colliding with the oncoming vehicle 200 when the own vehicle 100 potentially collides with the oncoming vehicle 200 as the own vehicle 100 turns rightward in the intersection 300. The oncoming vehicle 200 is a vehicle which moves in an oncoming traffic lane in a direction opposite to a moving direction of the own vehicle 100, approaching the own vehicle 100. The oncoming traffic lane is just on a right side of a traffic lane where the own vehicle 100 currently moves. Hereinafter, the traffic lane where the own vehicle 100 currently moves, will be referred to as "the own vehicle moving lane L1", and the oncoming traffic lane where the oncoming vehicle 200 currently moves will be referred to as "the oncoming traffic lane L2."

The embodiment driving assist apparatus determines whether the oncoming vehicle 200 exists, based on data acquired by a fusion-processing of the millimeter wave data and the image data. The embodiment driving assist apparatus determines whether a condition of executing the rightward-turning collision avoidance control is satisfied when the oncoming vehicle 200 exists. Hereinafter, the condition of executing the rightward-turning collision avoidance control will be referred to as "the control execution condition."

The control execution condition is satisfied when the own vehicle 100 turning rightward potentially collides with the oncoming vehicle 200. The embodiment driving assist apparatus determines that the own vehicle 100 turning rightward potentially collides with the oncoming vehicle 200 when (i) a turning condition is satisfied, and (ii) a collision condition is satisfied. The turning condition is a condition that the own vehicle 100 turns rightward, crossing the oncoming traffic lane L2. The collision condition is a condition that a collision index value Cidx described later is within a predetermined index value range Rcidx. Hereinafter, a potential that the own vehicle 100 turning rightward potentially collides with the oncoming vehicle 200, will be referred to as "the collision potential."

The embodiment driving assist apparatus determines that the turning condition is satisfied when (i) the own vehicle 100 will turn rightward, and (ii) the own vehicle 100 is potentially in a rightward-turning condition.

The embodiment driving assist apparatus determines that the own vehicle 100 will turn rightward when a first rightward-turning condition CR1 is satisfied. The first rightward-turning condition CR1 is a condition that the rightward-turning steering angle SAR is larger than or equal to a predetermined steering angle SAth. The predetermined steering angle SAth is the rightward-turning steering angle SAR minimally necessary to turn the own vehicle 100 rightward. In this embodiment, the predetermined steering angle SAth is previously set. The driver rotates the steering wheel 41 clockwise when the driver turns the own vehicle 100 rightward. Thereby, the rightward-turning steering angle SAR increases. Therefore, the embodiment driving assist apparatus determines that the own vehicle 100 will turn rightward when the rightward-turning steering angle SAR is larger than or equal to the predetermined steering angle SAth.

The embodiment driving assist apparatus determines that the own vehicle 100 is potentially in the rightward-turning state when a second rightward-turning condition CR2 is satisfied. The second rightward-turning condition is a condition that the own vehicle moving speed V1 is within a predetermined speed range Rv. The predetermined speed range Rv is a range of the moving speed considered as the general moving speed of the vehicle turning rightward. In this embodiment, the predetermined speed range Rv is previously set. A lower limit of the predetermined speed range Rv is larger than zero. An upper limit of the predetermined speed range Rv is smaller than the moving speed considered as the general moving speed of the vehicle moving to a next traffic lane. The next traffic lane is the traffic lane next to the traffic lane where the vehicle currently moves. Hereinafter, a moving of the vehicle to the next traffic lane will be referred to as "the lane change of the vehicle." The driver maintains the own vehicle moving speed V1 at a relatively small moving speed when the driver turns the own vehicle 100 rightward. Therefore, the embodiment driving assist apparatus determines that the own vehicle 100 is potentially in the rightward-turning state when the own vehicle moving speed V1 is within the predetermined speed range Rv.

<Collision Index Value>

Figure 5A:
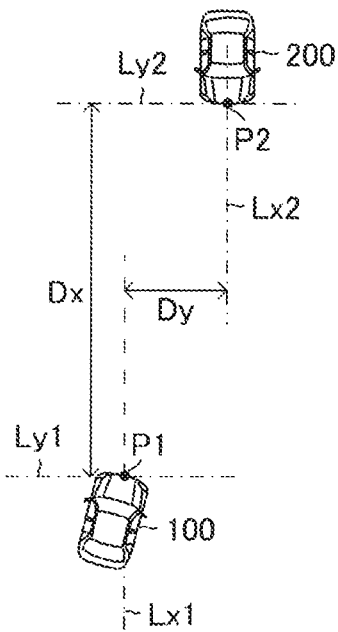
FIG. 5A is a view used for describing a longitudinal distance and a lateral distance.

The embodiment driving assist apparatus acquires a longitudinal distance Dx and a lateral distance Dy (see FIG. 5A). In addition, the embodiment driving assist apparatus acquires the collision index value Cidx, using the longitudinal distance Dx and the lateral distance Dy. The collision index value Cidx decreases as a ratio of the longitudinal distance Dx to the lateral distance Dy decreases. The predetermined index value range Rcidx is previously set to a range including the collision index value Cidx acquired when the lateral distance Dy is equal to the longitudinal distance Dx.

As shown in FIG. 5A, the longitudinal distance Dx is a distance between a first lateral line Ly1 and a second lateral line Ly2. The first lateral line Ly1 horizontally extends through an own vehicle reference point P1 perpendicular to a moving direction of the oncoming vehicle 200. The second lateral line Ly2 horizontally extends through an oncoming vehicle reference point P2 parallel to the first lateral line Ly1. The oncoming vehicle reference point P2 is a specified reference point on the oncoming vehicle 200. In this embodiment, the oncoming vehicle reference point P2 is a center point of a front end of the oncoming vehicle 200 in a width direction of the oncoming vehicle 200.

As shown in FIG. 5A, the lateral distance Dy is a distance between a first longitudinal line Lx1 and a second longitudinal line Lx2. The first longitudinal line Lx1 horizontally extends through the own vehicle reference point P1 perpendicular to the first lateral line Ly1. The second longitudinal line Lx2 horizontally extends through the oncoming vehicle reference point P2 perpendicular to the second lateral line Ly2. In other words, the second longitudinal line Lx2 horizontally extends through the oncoming vehicle reference point P2 parallel to the first longitudinal line Lx1.

The embodiment driving assist apparatus acquires a relative position Pr of the oncoming vehicle 200 relative to the own vehicle reference point P1, based on the millimeter wave data and the image data. Then, the embodiment driving assist apparatus acquires the longitudinal distance Dx and the lateral distance Dy, based on the relative position Pr. The own vehicle reference point P1 is a specified base position of the own vehicle 100. In this embodiment, the own vehicle reference point P1 is a center point of a front end of the own vehicle 100 in a width direction of the own vehicle 100.

In particular, the embodiment driving assist apparatus acquires the collision index value Cidx as follows.

Figure 5B:
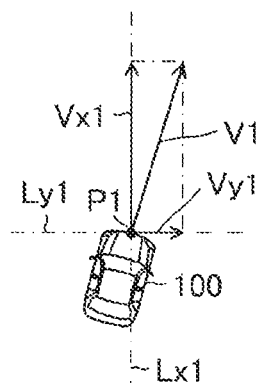
FIG. 5B is a view used for describing a moving speed of the own vehicle.

The embodiment driving assist apparatus acquires a longitudinal component Vx1 of the own vehicle moving speed V1 in addition to the longitudinal distance Dx and the lateral distance Dy. As shown in FIG. 5B, the longitudinal component Vx1 of the own vehicle moving speed V1 is a component of the own vehicle moving speed V1 in an extension direction of the first longitudinal line Lx1.

Figure 5C:
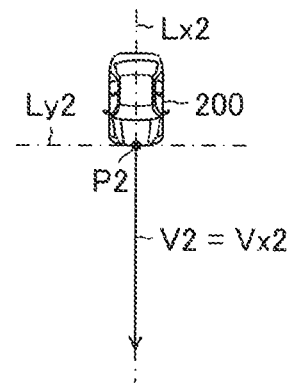
FIG. 5C is a view used for describing a moving speed of an oncoming vehicle.

Further, the embodiment driving assist apparatus acquires a longitudinal component Vx2 of the oncoming vehicle moving speed V2. As shown in FIG. 5C, the longitudinal component Vx2 of the oncoming vehicle moving speed V2 is a component of the oncoming vehicle moving speed V2 in an extension direction of the second longitudinal line Lx2. In an example shown in FIG. 5C, the moving direction of the oncoming vehicle 200 is the same as the extension direction of the second longitudinal line Lx2. Thus, the longitudinal component Vx2 of the oncoming vehicle moving speed V2 corresponds to the oncoming vehicle moving speed V2.

The embodiment driving assist apparatus acquires a longitudinal relative moving speed Vrx. The longitudinal relative moving speed Vrx is a value acquired by the longitudinal component Vx2 of the oncoming vehicle moving speed V2 to the longitudinal component Vx1 of the own vehicle moving speed V1. The longitudinal relative moving speed Vrx is a relative moving speed between the own vehicle 100 and the oncoming vehicle 200 in the extension direction of the first longitudinal line Lx1.

Further, the embodiment driving assist apparatus acquires a predicted longitudinal reaching time TTCx. The predicted longitudinal reaching time TTCx is a value acquired by dividing the longitudinal distance Dx by the longitudinal relative moving speed Vrx (TTCx=Dx/Vrx).

In addition, the embodiment driving assist apparatus acquires a lateral component Vy1 of the own vehicle moving speed V1. As shown in FIG. 5B, the lateral component Vy1 of the own vehicle moving speed V1 is a component of the own vehicle moving speed V1 in the extension direction of the first lateral line Ly1. In this embodiment, the lateral component Vy1 of the own vehicle moving speed V1 is positive when the own vehicle 100 turns rightward. On the other hand, the lateral component Vy1 of the own vehicle moving speed V1 is negative when the own vehicle 100 turns leftward.

In addition, the embodiment driving assist apparatus acquires an oncoming vehicle moving speed V2, based on the millimeter waver data and the image data. The oncoming vehicle moving speed V2 is the moving speed of the oncoming vehicle 200. Then, the embodiment driving assist apparatus acquires a lateral component Vy2 of the oncoming vehicle moving speed V2. The lateral component Vy2 of the oncoming vehicle moving speed V2 is a component of the oncoming vehicle moving speed V2 in an extension direction of the second lateral line Ly2. In the example shown in FIG. 5C, the moving direction of the oncoming vehicle 200 corresponds to the extension direction of the second longitudinal line Lx2. Thus, the lateral component Vy2 of the oncoming vehicle moving speed V2 is zero. In this embodiment, the lateral component Vy2 of the oncoming vehicle moving speed V2 is positive when the oncoming vehicle 200 turns rightward. On the other hand, the lateral component Vy2 of the oncoming vehicle moving speed V2 is negative when the oncoming vehicle 200 turns leftward.

The embodiment driving assist apparatus acquires a lateral relative moving speed Vry. The lateral relative moving speed Vry is a value acquired by adding the lateral component Vy2 of the oncoming vehicle moving speed V2 to the lateral component Vy1 of the own vehicle moving speed V1. The lateral relative moving speed Vry is a relative moving speed between the own vehicle 100 and the oncoming vehicle 200 in the extension direction of the first lateral line Ly1.

The embodiment driving assist apparatus acquires a predicted lateral reaching time TTCy by dividing the lateral distance Dy by the lateral relative moving speed Vry (TTCy=Dy/Vry).

Then, the embodiment driving assist apparatus acquires the collision index value Cidx by dividing the predicted longitudinal reaching time TTCx by the predicted lateral reaching time TTCy (Cidx=TTCx/TTCy). The collision index value Cidx acquired as described above is one of values which decrease as the ratio of the longitudinal distance Dx to the lateral distance Dy decreases. Further, the collision index value Cidx acquired as described above is one of values which (i) decrease as the ratio of the longitudinal distance Dx to the lateral distance Dy decreases, (ii) decrease as the longitudinal relative moving speed Vrx increases, and (iii) increase as the lateral relative moving speed Vry increases.

In this case, the predetermined index value range Rcidx is set as a range including "1". The predetermined index value range Rcidx set as such is one of ranges which include the collision index value Cidx to be acquired when the lateral distance Dy and the longitudinal distance Dx are equal to each other.

For example, when (i) the predicted lateral reaching time TTCy is three seconds, and (ii) the predicted longitudinal reaching time TTCx is twelve seconds, the collision index value Cidx is four. In this case, if the own vehicle 100 continues turning rightward, maintaining its moving speed, the own vehicle 100 may complete crossing the oncoming traffic lane before the oncoming vehicle 200 reaches a moving course of the own vehicle 100 turning rightward. In other words, if the own vehicle 100 continues turning rightward, maintaining its moving speed, the own vehicle 100 may complete turning right without colliding with the oncoming vehicle 200. Therefore, an upper limit of the predetermined index value range Rcidx is larger than one. In addition, the upper limit of the predetermined index value range Rcidx is a largest one of the collision index values Cidx smaller than the smallest permitted collision index value Cidx. The smallest permitted collision index value Cidx is a smallest one of the collision index values Cidx with which the own vehicle 100 completes crossing the oncoming traffic lane before the oncoming vehicle 200 reaches the moving course of the own vehicle 100 when the own vehicle 100 turns rightward, maintaining its moving speed.

When (i) the predicted lateral reaching time TTCy is five seconds, and (ii) the predicted longitudinal reaching time TTCx is one second, the collision index value Cidx is 0.2. In this case, if the own vehicle 100 continues turning rightward, maintaining its moving speed, the own vehicle 100 crosses the oncoming traffic lane after the oncoming vehicle 200 crosses the moving course of the own vehicle 100 turning rightward. In other words, the own vehicle 100 can complete turning rightward without colliding with the oncoming vehicle 200 when the own vehicle 100 continues turning rightward, maintaining its moving speed. Therefore, a lower limit of the predetermined index value range Rcidx is smaller than one. In addition, the lower limit of the predetermined index value range Rcidx is a smallest one of the collision index values Cidx larger than the largest permitted collision index value Cidx. The largest permitted collision index value Cidx is a largest one of the collision index values Cidx with which the own vehicle 100 crosses the oncoming traffic lane after the oncoming vehicle 200 completes crossing the moving course of the own vehicle 100 turning rightward when the own vehicle 100 turns rightward, maintaining its moving speed.

Therefore, the collision potential that the own vehicle 100 potentially collides with the oncoming vehicle 200 is large when the collision index value Cidx is near one.

The embodiment driving assist apparatus may be configured to determine whether the own vehicle 100 will turn rightward, based on a third rightward-turning condition CR3 in place of or in addition to the first rightward-turning condition CR1. The third rightward-turning condition CR3 is that the right turn signals 51 are blinking. In this case, the embodiment driving assist apparatus determines that the own vehicle 100 will turn rightward when (i) the third condition CR3 is satisfied, or (ii) the third and first conditions CR3 and CR1 are satisfied. The third rightward-turning condition CR3 may be a condition that the right turn signals 51 indicate that the own vehicle 100 will turn rightward. The driver operates the turn signal lever 50 to blink the right turn signals 51 when the driver intends to turn the own vehicle 100 rightward. Thereby, the right turn signals 51 blinks. Therefore, when the right turn signals 51 are blinking, the embodiment driving assist apparatus can determine that the own vehicle 100 will turn rightward.

When the predetermined steering angle SAth is set to a value which can distinguish the rightward-turning steering angle SAR for turning the own vehicle 100 rightward from the rightward-turning steering angle SAR for moving the own vehicle 100 to the next traffic lane, the second rightward-turning condition CR2 may be omitted.

<Normal Acceleration/Deceleration Control>

The embodiment driving assist apparatus acquires a requested driving torque TQreq, based on the acceleration pedal depression amount AP and the own vehicle moving speed V1 when the embodiment driving assist apparatus executes the normal acceleration/deceleration control. The requested driving torque TQreq is the driving torque TQdry to be output from the driving torque generation apparatus 10. The embodiment driving assist apparatus controls the operations of the driving torque generation apparatus 10 to control the driving torque TQdry output from the own vehicle 100 to the requested driving torque TQreq. When the acceleration pedal depression amount AP is zero, the requested driving torque TQreq is zero.

The embodiment driving assist apparatus acquires a requested braking force BKreq, based on the brake pedal depression amount BP when the embodiment driving assist apparatus executes the normal acceleration/deceleration control. The requested braking force BKreq is the braking force BK to be applied to the wheels 100W from the brake apparatus 20. The embodiment driving assist apparatus controls the operations of the brake apparatus 20 to control the braking force BK applied to the wheels 100W to the requested braking force BKreq. When the brake pedal depression amount BP is zero, the requested braking force BKreq is zero.

<Rightward-Turning Collision Avoidance Control>

When the embodiment driving assist apparatus executes the rightward-turning collision avoidance control, the embodiment driving assist apparatus executes a braking process to apply the braking forces to the wheels 100W by the brake apparatus 20 to stop the own vehicle 100.

The rightward-turning collision avoidance control may include an alert image process as one of alert processes in place of or in addition to the braking process. The alert image process is a process to cause the display device 31 to display an alert image for informing the driver of the own vehicle 100 that the own vehicle 100 potentially collides with the oncoming vehicle 200.

Further, the rightward-turning collision avoidance control may include an alert sound process as one of the alert processes in place of or in addition to the braking process and/or the alert image process. The alert sound process is a process to cause the buzzer device 32 to generate an alert sound as an alert for informing the driver of the own vehicle 100 that the own vehicle 100 potentially collides with the oncoming vehicle 200.

Furthermore, the rightward-turning collision avoidance control may include a driving torque process in place of or in addition of the braking process and/or the alert image process and/or the alert sound process. The driving torque process is a process to control the operations of the driving torque generation apparatus 10 to control the driving torque TQdry to zero even when the acceleration pedal depression amount AP is larger than zero.

When (i) the oncoming vehicle 200 exists, and (ii) the own vehicle 100 is turning, crossing the oncoming traffic lane L2, the longitudinal distance Dx shortens gradually. The collision potential increases as the longitudinal distance Dx shortens. Thus, there may be a way to (i) acquire the collision index value Cidx which decreases as the longitudinal distance Dx shortens, independently of the lateral distance Dy and is zero when the longitudinal distance Dx is zero and (ii) determine that the own vehicle 100 potentially collides with the oncoming vehicle 200 when the acquired collision index value Cidx decreases to or below a predetermined threshold.

In this regard, there is a distance between the moving course of the oncoming vehicle 200 and the position of the own vehicle 100 (i.e., the lateral distance Dy). Thus, even when the longitudinal distance Dx shortens with the large lateral distance Dy, the collision potential is small. Therefore, when the collision potential is determined, only based on the longitudinal distance Dx without the lateral distance Dy, an accuracy of the determination of the collision potential is lower than when the collision potential is determined, based on both the longitudinal distance Dx and the lateral distance Dy.

In addition, under a situation that the longitudinal distance Dx is the same, the oncoming vehicle 200 takes shorter time to reach the moving course of the own vehicle 100 when the longitudinal relative moving speed Vrx is large than when the longitudinal relative moving speed Vrx is small. Similarly, under a situation that the lateral distance Dy is the same, the own vehicle 100 takes shorter time to reach the moving course of the oncoming vehicle 200 when the lateral relative moving speed Vry is large than when the lateral relative moving speed Vry is small. Therefore, a timing of the oncoming vehicle 200 reaching the moving course of the own vehicle 100 varies, depending on the longitudinal relative moving speed Vrx. In addition, a timing of the own vehicle 100 reaching the moving course of the oncoming vehicle 200 varies, depending on the lateral relative moving speed Vry. When the timing of the oncoming vehicle 200 reaching the moving course of the own vehicle 100 corresponds to the timing of the own vehicle 100 reaching the moving course of the oncoming vehicle 200, the own vehicle 100 collides with the oncoming vehicle 200. Therefore, when the collision potential is determined, based on the longitudinal distance Dx and the lateral distance Dy without the longitudinal relative moving speed Vrx and the lateral relative moving speed Vry, an accuracy of the determination of the collision potential is lower than when the collision potential is determined, based on (i) the longitudinal distance Dx, (ii) the lateral distance Dy, (iii) the longitudinal relative moving speed Vrx, and (iv) the lateral relative moving speed Vry.

The embodiment driving assist apparatus determines the collision potential, based on the collision index value Cidx which (i) decreases as the ratio of the longitudinal distance Dx to the lateral distance Dy decreases, (ii) decreases as the longitudinal relative moving speed Vrx increases, and (iii) increases as the lateral relative moving speed Vry increases. Therefore, the embodiment driving assist apparatus determines the collision potential in consideration of (i) the longitudinal distance Dx, (ii) the lateral distance Dy, (iii) the longitudinal relative moving speed Vrx, and (iv) the lateral relative moving speed Vry. Thereby, the embodiment driving assist apparatus accurately determines the collision potential.

In addition, the embodiment driving assist apparatus stops the own vehicle 100 when the own vehicle 100 potentially collides with the oncoming vehicle 200. Thereby, the own vehicle 100 is prevented from colliding with the oncoming vehicle 200.

In addition, the embodiment driving assist apparatus promotes the driver to brake the own vehicle 100 by executing the alert image process and/or the alert sound process of the rightward-turning collision avoidance control when the own vehicle 100 potentially collides with the oncoming vehicle 200. Thereby, the own vehicle 100 is prevented with certainty from colliding with the oncoming vehicle 200.

In addition, when the rightward-turning collision avoidance control includes the driving torque process, the driving torque is not applied to the own vehicle 100 having the collision potential. As a result, the own vehicle 100 decelerates. Thereby, the own vehicle 100 is prevented with more certainty from colliding with the oncoming vehicle 200.

MODIFIED EXAMPLES

The vehicles may be regulated by a traffic rule to move on the right side of the road. In this case, the embodiment driving assist apparatus is configured to execute the normal acceleration/deceleration control and a leftward-turning collision avoidance control. Hereinafter, the embodiment driving assist apparatus configured as such will be referred to as "the modified driving assist apparatus."

Figure 6:
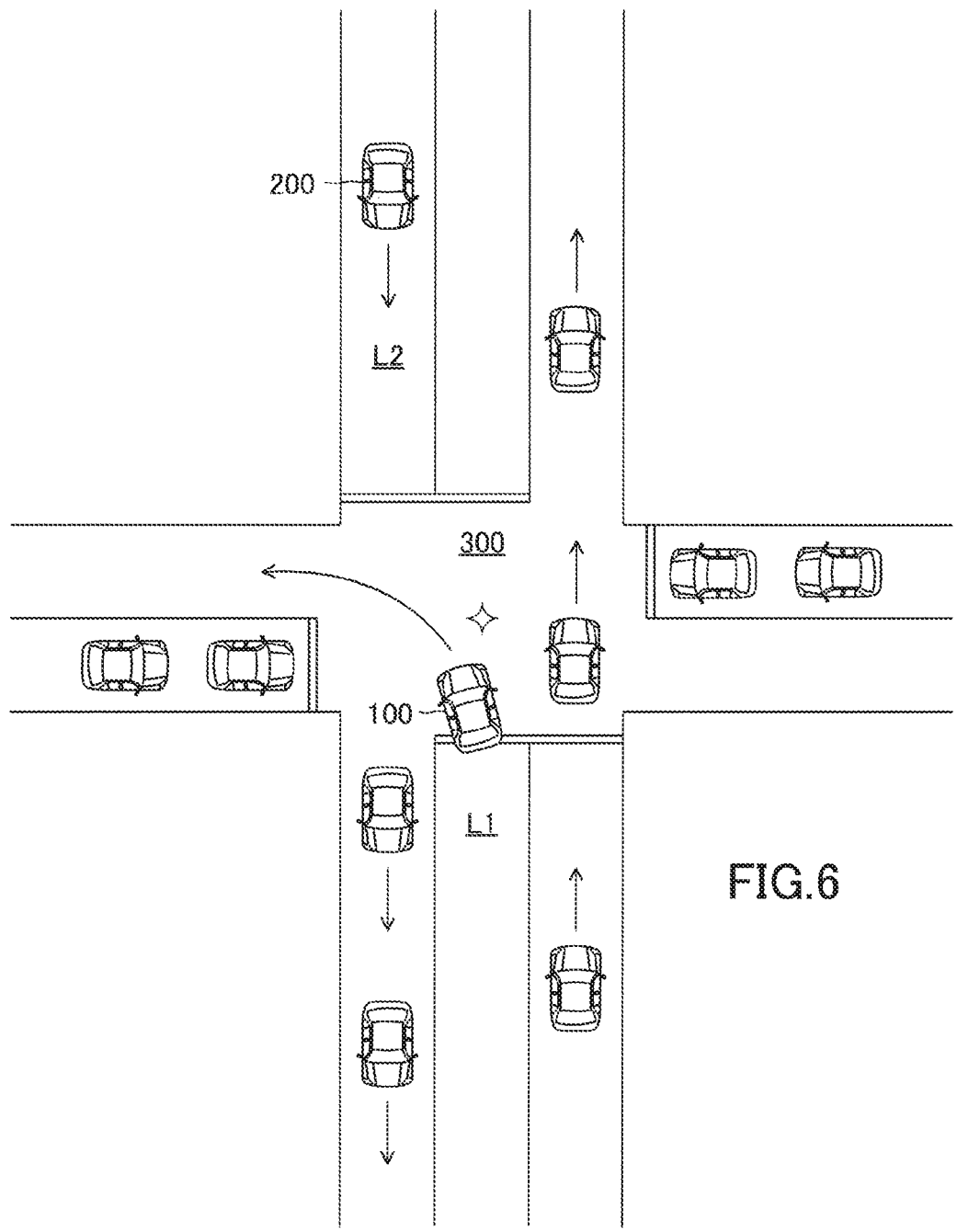
FIG. 6 is a view used for describing a leftward-turning collision avoidance control executed by the vehicle driving assist apparatus.

The leftward-turning collision avoidance control is a control to stop the own vehicle 100, thereby preventing the own vehicle 100 from colliding with the oncoming vehicle 200 when the own vehicle 100 turning leftward potentially collides with the oncoming vehicle 200. For example, the leftward-turning collision avoidance control is a control to stop the own vehicle 100, thereby preventing the own vehicle 100 from colliding with the oncoming vehicle 200 when (i) the own vehicle 100 turns leftward in the intersection 300 as shown in FIG. 6, and (ii) the own vehicle 100 potentially collides with the oncoming vehicle 200. The oncoming vehicle 200 moves, approaching the own vehicle 100 in the traffic lane left next to the own vehicle moving lane L1 in a direction opposite to the moving direction of the own vehicle 100. Hereinafter, the traffic lane left next to the own vehicle moving lane L1 will be referred to as "the oncoming lane L2."

The modified driving assist apparatus determines whether the oncoming vehicle 200 exists, based on data acquired by fusion-processing the millimeter data and the image data. When the oncoming vehicle 200 exists, the modified driving assist apparatus determines whether a control execution condition of executing the leftward-turning collision avoidance control is satisfied.

The control execution condition is satisfied when the own vehicle 100 turning leftward potentially collides with the oncoming vehicle 200. The modified driving assist apparatus determines that the own vehicle 100 potentially collides with the oncoming vehicle 200 when (i) a turning condition is satisfied, and (ii) a collision condition is satisfied. The turning condition is a condition that the own vehicle 100 turns leftward, crossing the oncoming traffic lane L2. The collision condition is a condition that the collision index value Cidx is within the predetermined index value range Rcidx. Hereinafter, a potential that the own vehicle 100 turning leftward potentially collides with the oncoming vehicle 200, will be referred to as "the collision potential."

When the modified driving assist apparatus determines that (i) the own vehicle 100 will turn leftward, and (ii) the own vehicle 100 be potentially in a leftward-turning state, the modified driving assist apparatus determines that the turning condition is satisfied.

When a first leftward-turning condition CL1 is satisfied, the modified driving assist apparatus determines that the own vehicle 100 will turn leftward. The first leftward-turning condition CL1 is a condition that the leftward-turning steering angle SAL is larger than or equal to a predetermined steering angle SAth. The predetermined steering angle SAth corresponds to the leftward-turning steering angle SAL minimally necessary to turn the own vehicle 100 leftward and is previously set. When the driver turns the own vehicle 100, the driver rotates the steering wheel 41 counterclockwise. Thereby, the leftward-turning steering angle SAL increases. Therefore, the modified driving assist apparatus determines that the own vehicle 100 is turning leftward when the leftward-turning steering angle SAL is larger than or equal to the predetermined steering angle SAth.

Further, when a second leftward-turning condition CL2 is satisfied, the modified driving assist apparatus determines that the own vehicle 100 is potentially in a leftward-turning state. The second leftward-turning condition CL2 is a condition that the own vehicle moving speed V1 is within a predetermined speed range Rv. The predetermined speed range Rv is a range of the moving speed considered as a general moving speed of the vehicle turning leftward and is previously set. A lower limit of the predetermined speed range Rv is set to a value larger than zero. An upper value of the predetermined speed range Rv is set to a value smaller than the general moving speed of the vehicle moving to the next traffic lane. The next traffic lane is the traffic lane next to the traffic lane where the vehicle currently moves. Hereinafter, a moving of the vehicle to the next traffic lane will be referred to as "the lane change of the vehicle." When the driver turns the own vehicle 100 leftward, the driver maintains the own vehicle moving speed V1 at the relatively small speed. Therefore, the modified driving assist apparatus determines that the own vehicle 100 is potentially in the leftward-turning state.

Figure 7A:
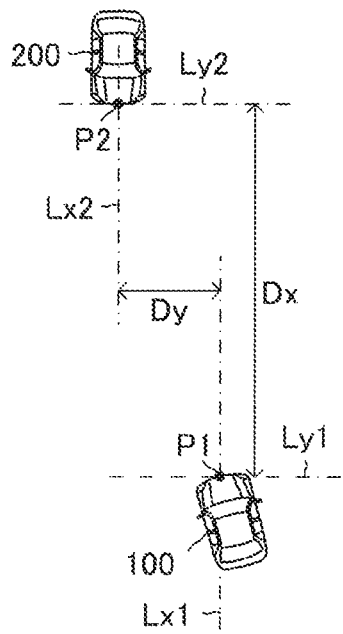
FIG. 7A is a view used for describing the longitudinal distance and the lateral distance.

In addition, the modified driving assist apparatus acquires the longitudinal distance Dx and the lateral distance Dy as shown in FIG. 7A. Then, the modified driving assist apparatus acquires the collision index value Cidx which decreases as the ratio of the longitudinal distance Dx to the lateral distance Dy decreases. The predetermined index value range Rcidx is a range including the collision index value Cidx acquired when the longitudinal distance Dx is equal to the lateral distance Dy. In this embodiment, the predetermined index value range Rcidx is previously set.

As shown in FIG. 7A, the longitudinal distance Dx is a distance between the first lateral line Ly1 and the second lateral line Ly2. The lateral distance Dy is a distance between the first longitudinal line Lx1 and the second longitudinal line Lx2. The modified driving assist apparatus acquires the relative position Pr of the oncoming vehicle 200 relative to the own vehicle reference point P1, based on the millimeter wave data and the image data. Then, the modified driving assist apparatus acquires the longitudinal distance Dx and the lateral distance Dy, using the relative position Pr.

In particular, the modified driving assist apparatus acquires the collision index value Cidx as follows.

Figure 7B:
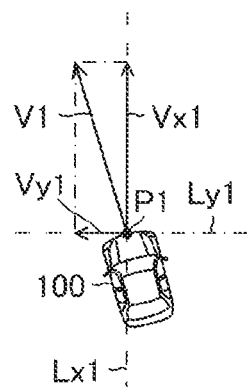
FIG. 7B is a view used for describing the moving speed of the own vehicle.

The modified driving assist apparatus acquires (i) the longitudinal distance Dx, (ii) the lateral distance Dy, and (iii) a longitudinal component Vx1 of the own vehicle moving speed V1. As shown in FIG. 7B, the longitudinal component Vx1 of the own vehicle moving speed V1 is a component of the own vehicle moving speed V1 in an extension direction of the first longitudinal line Lx1.

Figure 7C:
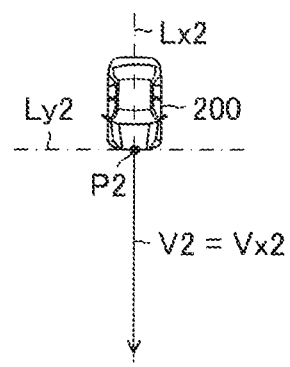
FIG. 7C is a view used for describing the moving speed of the oncoming vehicle.

In addition, the modified driving assist apparatus acquires a longitudinal component Vx2 of the oncoming vehicle moving speed V2. As shown in FIG. 7C, the longitudinal component Vx2 of the oncoming vehicle moving speed V2 is a component of the oncoming vehicle moving speed V2 in an extension direction of the second longitudinal line Lx2. In an example shown in FIG. 7C, the moving direction of the oncoming vehicle 200 corresponds to the extension direction of the second longitudinal line Lx2. Thus, the longitudinal component Vx2 of the oncoming vehicle moving speed V2 is equal to the oncoming vehicle moving speed V2.

Then, the modified driving assist apparatus acquires a longitudinal relative moving speed Vrx by adding the longitudinal component Vx2 of the oncoming vehicle moving speed V2 to the longitudinal component Vx1 of the own vehicle moving speed V1. The longitudinal relative moving speed Vrx is a relative moving speed between the own vehicle 100 and the oncoming vehicle 200 in the extension direction of the first longitudinal line Lx1.

In addition, the modified driving assist apparatus acquires the predicted longitudinal reaching time TTCx by dividing the longitudinal distance Dx by the longitudinal relative moving speed Vrx (TTCx=Dx/Vrx).

In addition, the modified driving assist apparatus acquires a lateral component Vy1 of the own vehicle moving speed V1. As shown in FIG. 7B, the lateral component Vy1 of the own vehicle moving speed V1 is a component of the own vehicle moving speed V1 in the extension direction of the first lateral line Ly1. In this example, the lateral component Vy1 of the own vehicle moving speed V1 of the own vehicle 100 turning leftward is positive. On the other hand, the lateral component Vy1 of the own vehicle moving speed V1 of the own vehicle 100 turning rightward is negative.

In addition, the modified driving assist apparatus acquires the oncoming vehicle moving speed V2, based on the millimeter wave data and the image data. Then, the modified driving assist apparatus acquires a lateral component Vy2 of the oncoming vehicle moving speed V2. The lateral component Vy2 of the oncoming vehicle moving speed V2 is a component of the oncoming vehicle moving speed V2 in the extension direction of the second lateral line Ly2. In an example shown in FIG. 7C, the moving direction of the oncoming vehicle 200 corresponds to the extension direction of the second longitudinal line Lx2. Thus, the lateral component Vy2 of the oncoming vehicle moving speed V2 is zero. In this example, the lateral component Vy2 of the oncoming vehicle moving speed V2 of the oncoming vehicle 200 turning leftward is positive. On the other hand, the lateral component Vy2 of the oncoming vehicle moving speed V2 of the oncoming vehicle 200 turning rightward is negative.

Then, the modified driving assist apparatus acquires a lateral relative moving speed Vry by adding the lateral component Vy2 of the oncoming vehicle moving speed V2 to the lateral component Vy1 of the own vehicle moving speed V1. The lateral relative moving speed Vry is a relative moving speed between the own vehicle 100 and the oncoming vehicle 200 in the extension direction of the first lateral line Ly1.

In addition, the modified driving assist apparatus acquires the predicted lateral reaching time TTCy by dividing the lateral distance Dy by the lateral relative moving speed Vry (TTCy=Dy/Vry).

Then, the modified driving assist apparatus acquires the collision index value Cidx by dividing the predicted longitudinal reaching time TTCx by the predicted lateral reaching time TTCy (Cidx=TTCx/TTCy). The collision index value Cidx acquired as such is one of values which decrease as the ratio of the longitudinal distance Dx to the lateral distance Dy decreases. In addition, the collision index value Cidx acquired as such is one of values which (i) decrease as the ratio of the longitudinal distance Dx to the lateral distance Dy decreases, (ii) decrease as the longitudinal relative moving speed Vrx increases, and (iii) increases as the lateral relative moving speed Vry increases.

The predetermined index value range Rcidx is set to a range including one. The predetermined index value range Rcidx set as such is one of ranges including the collision index value Cidx acquired when the longitudinal distance Dx is equal to the lateral distance Dy.

Also, in this example, the collision potential that the own vehicle 100 collides with the oncoming vehicle 200 increases as the collision index value Cidx approaches one.

The modified driving assist apparatus may be configured to determine that the own vehicle 100 will turn leftward when (i) a third leftward-turning condition CL3 is satisfied, or (ii) the first leftward-turning condition CL1 is satisfied, and the third leftward-turning condition CL3 is satisfied. The third leftward-turning condition CL3 is a condition that the left turn signals blink. In other words, the third leftward-turning condition CL3 is a condition that operation states of the left turn signals 52 indicate that the own vehicle 100 will turn leftward. When the driver of the own vehicle 100 operates the turn signal lever 50 to blink the left turn signals 52 when the driver turns the own vehicle 100 leftward. Thereby, the left turn signals 52 blink. Therefore, the modified driving assist apparatus determines that the own vehicle 100 will turn leftward when the left turn signals 52 blink.

When the predetermined steering angle SAth is set to a value which distinguishes the leftward-turning steering angle SAL of the own vehicle 100 turning leftward from the leftward-turning steering angle SAL of the own vehicle 100 moving to the next traffic lane, the second leftward-turning condition CL2 may be omitted.

<Leftward-Turning Collision Avoidance Control>

When the modified driving assist apparatus executes the leftward-turning collision avoidance control, the modified driving assist apparatus executes the braking process to apply the braking forces to the wheels 100W, respectively by the brake apparatus 20 to stop the own vehicle 100.

The leftward-turning collision avoidance control may include an alert image process as one of the alert processes in place of or in addition to the braking process. The alert image process is a process to cause the display device 31 to display an alert image for informing the driver of the own vehicle 100 that the own vehicle 100 potentially collides with the oncoming vehicle 200.

Further, the leftward-turning collision avoidance control may include an alert sound process as one of the alert processes in place of or in addition to the braking process and/or the alert image process. The alert sound process is a process to cause the buzzer device 32 to generate an alert sound as an alert for informing the driver of the own vehicle 100 that the own vehicle 100 potentially collides with the oncoming vehicle 200.

Furthermore, the leftward-turning collision avoidance control may include a driving torque process in place of or in addition of the braking process and/or the alert image process and/or the alert sound process. The driving torque process is a process to control the operations of the driving torque generation apparatus 10 to control the driving torque TQdry to zero even when the acceleration pedal depression amount AP is larger than zero.

The modified driving assist apparatus determines the collision potential in consideration of the longitudinal relative moving speed Vrx and the lateral relative moving speed Vry in addition to the longitudinal distance Dx and the lateral distance Dy. The modified driving assist apparatus can determine the collision potential with more accuracy.

In addition, the modified driving assist apparatus stops the own vehicle 100 when the own vehicle 100 potentially collides with the oncoming vehicle 200. Thereby, the own vehicle 100 is prevented from colliding with the oncoming vehicle 200.

In addition, the modified driving assist apparatus promotes the driver to brake the own vehicle 100 by executing the alert image process and/or the alert sound process of the leftward-turning collision avoidance control when the own vehicle 100 potentially collides with the oncoming vehicle 200. Thereby, the own vehicle 100 is prevented with certainty from colliding with the oncoming vehicle 200.

In addition, when the leftward-turning collision avoidance control includes the driving torque process, the driving torque is not applied to the own vehicle 100 having the collision potential. As a result, the own vehicle 100 decelerates. Thereby, the own vehicle 100 is prevented with more certainty from colliding with the oncoming vehicle 200.

<Particular Operations of Embodiment Driving Assist Apparatus>

Figure 8:
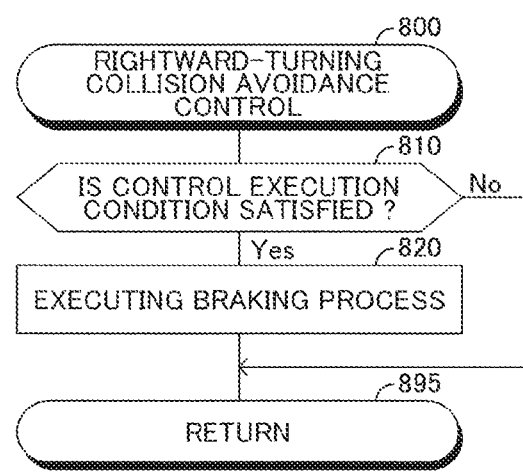
FIG. 8 is a view which shows a flowchart of a routine executed by a CPU of an ECU shown in FIG. 1.

The CPU of the ECU 90 of the embodiment driving assist apparatus is configured to or programmed to execute a routine shown in FIG. 8 each time a predetermine time elapses. Therefore, at a predetermined timing, the CPU starts a process from a step 800 of FIG. 8 and proceeds with the process to a step 810 to determine whether the control execution condition is satisfied. When the CPU determines "Yes" at the step 810, the CPU proceeds with the process to a step 820 to execute the braking process. Then, the CPU proceeds with the process to a step 895 to terminate this routine once. On the other hand, when the CPU determines "No" at the step 810, the CPU proceeds with the process to the step 895 to terminate this routine once.

It should be noted that the present disclosure is not limited to the aforementioned embodiment and various modifications can be employed within the scope of the present disclosure.

For example, the embodiment driving assist apparatus determines whether the collision condition is satisfied, using the collision index value Cidx acquired by dividing the predicted longitudinal reaching time TTCx by the predicted lateral reaching time TTCy. In this regard, the embodiment driving assist apparatus may be configured to determine whether the collision condition is satisfied, using the collision index value Cidx acquired by subtracting the predicted lateral reaching time TTCy from the predicted longitudinal reaching time TTCx (Cidx=TTCx−TTCy). In this case, the predetermined index value range Rcidx is set to a range including zero.

What is claimed is:

1. A vehicle driving assist apparatus, comprising:
an information acquisition apparatus which acquires information on situations ahead of the own vehicle as forward situation information; and
an electronic control unit for determining whether an own vehicle potentially collides with an oncoming vehicle, based on the forward situation information,
wherein the electronic control unit is configured to:
acquire, as a longitudinal distance, a distance between a first lateral line and a second lateral line, based on the forward situation information, the first lateral line horizontally extending perpendicular to a moving direction of the oncoming vehicle and passing through a specified reference point of the own vehicle, the second lateral line extending parallel to the first lateral line and passing through a specified reference point of the oncoming vehicle;
acquire, as a lateral distance, a distance between a first longitudinal line and a second longitudinal line, based on the forward situation information, the first longitudinal line horizontally extending perpendicular to the first lateral line and passing through the specified reference point of the own vehicle, the second longitudinal line extending parallel to the first longitudinal line and passing through the specified reference point of the oncoming vehicle;
acquire, as a collision index value, a value which decreases as a ratio of the longitudinal distance to the lateral distance decreases; and
determine that the own vehicle potentially collides with the oncoming vehicle when (i) a turning condition is satisfied, and (ii) a collision condition is satisfied, the turning condition being a condition that the own vehicle turns, crossing an oncoming traffic lane, the collision condition being a condition that the collision index value is within a predetermined index value range, the predetermined index value range at least including the collision index value acquired when the longitudinal distance is equal to the lateral distance.

2. The vehicle driving assist apparatus as set forth in claim 1, wherein the electronic control unit is further configured to:
acquire, as a longitudinal relative moving speed, a relative moving speed between the own vehicle and the oncoming vehicle in an extension direction of the first longitudinal line;
acquire, as a lateral relative moving speed, a relative moving speed between the own vehicle and the oncoming vehicle in an extension direction of the first lateral line; and
acquire, as the collision index value, a value which (i) decreases as the ratio of the longitudinal distance to the lateral distance decreases, (ii) decreases as the longitudinal relative moving speed increases, and (iii) increases as the lateral relative moving speed increases.

3. The vehicle driving assist apparatus as set forth in claim 1, wherein:
the electronic control unit is further configured to determine that the turning condition is satisfied when (i) a steering angle of the own vehicle is larger than or equal to a predetermined steering angle, and (ii) a moving speed of the own vehicle is within a predetermined speed range;

the predetermined steering angle corresponds to the steering angle of the own vehicle minimally necessary to turn the own vehicle, crossing the oncoming traffic lane; and the predetermined speed range corresponds to a range of the moving speed of the own vehicle turning, crossing the oncoming traffic lane.

4. The vehicle driving assist apparatus as set forth in claim 1, wherein:

the electronic control unit is further configured to determine that the turning condition is satisfied when (i) a steering angle of the own vehicle is larger than or equal to a predetermined steering angle, (ii) a moving speed of the own vehicle is within a predetermined moving speed range, and (iii) a turn signal of the own vehicle indicates that the own vehicle will turn toward the oncoming traffic lane;

the predetermined steering angle corresponds to the steering angle of the own vehicle necessary to turn the own vehicle, crossing the oncoming traffic lane; and the predetermined moving speed range corresponds to a range of the moving speed of the own vehicle turning, crossing the oncoming traffic lane.

5. The vehicle driving assist apparatus as set forth in claim 1, wherein:

the electronic control unit is further configured to determine that the turning condition is satisfied when (i) a moving speed of the own vehicle is within a predetermined moving speed range, and (ii) a turn signal of the own vehicle indicates that the own vehicle will turn toward the oncoming traffic lane; and the predetermined moving speed range corresponds to a range of the moving speed of the own vehicle turning, crossing the oncoming traffic lane.

6. The vehicle driving assist apparatus as set forth in claim 1, wherein the electronic control unit is further configured to brake and stop the own vehicle when the electronic control unit determines that the own vehicle potentially collides with the oncoming vehicle.

7. The vehicle driving assist apparatus as set forth in claim 1, wherein the electronic control unit is further configured to provide a driver of the own vehicle with an alert for informing that the own vehicle potentially collides with the oncoming vehicle when the electronic control unit determines that the own vehicle potentially collides with the oncoming vehicle.

8. The vehicle driving assist apparatus as set forth in claim 1, wherein the electronic control unit is further configured to control a driving torque applied to the own vehicle to zero when the electronic control unit determines that the own vehicle potentially collides with the oncoming vehicle.

9. The vehicle driving assist apparatus as set forth in claim 1, wherein the information acquisition apparatus includes at least one of a radar sensor and a camera apparatus.

* * * * *